July 14, 1959 V. C. HALL 2,895,006
APPARATUS FOR BALANCING SCANNING SYSTEMS
Filed Aug. 28, 1952
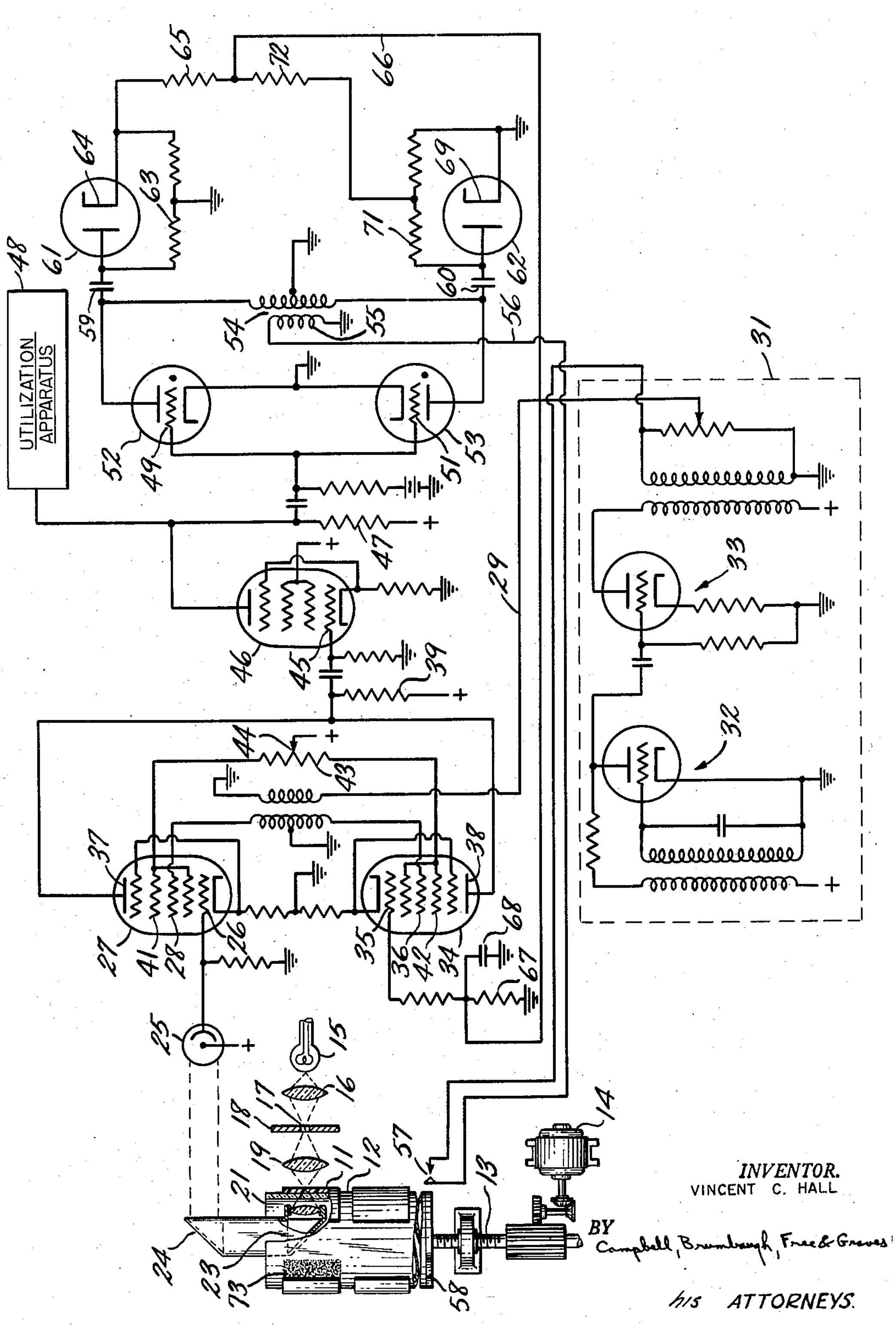
INVENTOR.
VINCENT C. HALL
BY Campbell, Brumbaugh, Free & Graves
his ATTORNEYS.

2,895,006
Patented July 14, 1959

2,895,006

APPARATUS FOR BALANCING SCANNING SYSTEMS

Vincent C. Hall, Stamford, Conn., assignor to Eastman Kodak Company, Rochester, N.Y., a corporation of New Jersey Application August 28, 1952, Serial No. 306,908

3 Claims. (Cl. 178—7.1)

The present invention relates to scanning systems wherein different portions of a subject are successively scanned by a beam of light and, more particularly, to the maintenance of a predetermined relationship between the variable intensity of a light signal representative of the tone gradations in the scanned subject and the variable amplitude of an electrical signal responsive to the light signal.

Electro-optical apparatus are well-known for scanning a subject, such as a positive or negative transparency or a print in monochrome or color, by focusing a beam of light on the subject while it is mounted on a rapidly rotating and slowly axially moving cylinder. The cylinder is transparent if the subject is scanned by transmitted light, but it may be opaque if the scanning is done by reflected light. The transmitted or reflected light from the subject may pass through a color filter, if desired, and impinges upon a photo-sensitive device, such as a photo-electric cell, which generates an electrical signal having an amplitude dependent upon the intensity of the intercepted light. The electrical signal is amplified and may be employed to transmit the subject by wire or radio to a remote point for reproduction. Other electro-optical systems modify the electrical signal by various operations, such as amplitude compression, color correction and masking. The modified signal may be employed in the production of a color plate for use in a multi-color printing process of color reproduction.

The electrical signals generated in response to the light signals representative of the tone gradations in the subject are unidirectional. In this condition, these signals are difficult to amplify, and it is well-known that direct current amplifiers are subject to considerable drift. This drift is reproduced as a shift in the tones toward one end of the tone scale. Accordingly, it has been the general practice to employ some means of modulating the electrical signals upon a high frequency carrier. For example, the scanning light beam may be chopped by a rotating shutter intercepting the optical path. Alternatively, the light source may be energized by a high frequency electrical voltage or the signals generated by the photo-sensitive device may be employed to modulate a carrier wave before further amplification.

Although the expedient of amplifying a carrier that is modulated by signals corresponding to the tone gradations in a subject eliminates the zero drifts inherent in direct current amplifiers, there still remain spurious variations in the electrical signals not in accordance with the tone gradations in the subject but due to changes in the characteristics of the electronic tubes or circuit elements in the apparatus.

It is an object of the present invention to maintain the amplitude-intensity relationship between the electrical signals and the light signals substantially constant in an electro-optical scanning system.

In accordance with the invention, a subject, such as a picture, is intermittently scanned with a beam of light and a variable intensity light signal is generated representative of the tone gradations in the subject. In the interval between successive scans, a light signal of reference, preferably constant, intensity is generated. Electrical signals are generated in response to the light signals and the amplitude of the electrical signal which is generated during each interval between successive scans is detected and utilized to maintain the amplitude-intensity relationship between the electrical signals and the light signals constant. In other words, a predetermined electrical amplitude corresponds to the reference light intensity.

In the embodiment of the invention chosen for illustration, the light signal of reference intensity is obtained from the gap in a transparent cylinder between opposite edges of a picture which is wrapped partially around the cylinder. In this embodiment, a modulation of the electrical signals is effected immediately following their conversion from the light signals by the photo-sensitive device. The amplitude of the modulated alternating signal is detected during each interval between successive scans and is utilized to adjust the modulator so that the amplitude of the modulated alternating signal is subtsantially zero in the presence of the reference intensity. The adjustment remains substantially constant during the successive scan and is readjusted, if necessary, during the next interval.

In order that the invention may be more clearly understood, it will now be described in detail with reference to the accompanying drawing in which the single figure is a schematic diagram of electro-optical scanning system for converting the tone gradations of a subject into a series of electrical signals the amplitudes of which are maintained in a predetermined relationship to the tone gradations by the balancing apparatus of the present invention.

In the apparatus illustrated, a subject 11, such as a Kodachrome transparency, is mounted for optical scanning on a transparent drum 12. The drum 12 is arranged to be rotated about its axis while slowly being fed axially by means of a coaxial lead screw 13 supporting the drum 12 and driven by a motor 14. The scanning drum may, if desired, be made of sufficient length to accommodate color separation negatives which can be reproduced simultaneously with the scanning of the subject 11. A light source 15 is directed by a lens 16 through a small aperture 17 in an opaque diaphragm 18 and focussed by a further lens 19 in a point of light upon the subject 11.

The light transmitted by the subject 11 passes into the interior of the transparent scanning drum 12 and is collimated by a lens 21 in a fixed optical assembly 22. Prisms 23 and 24 direct the beam exteriorly of the drum 12 to a photo-sensitive device 25 which generates a unidirectional electrical signal in response to the impinging light beam.

If the scanning system were employed in a color correction system, the light beam would be separated into a plurality of paths and transmitted through color filters to respective photo-sensitive devices. The balancing apparatus of the present invention would be applicable to all color channels where the relationship between the intensity of the light beam and the amplitude of the resultant electrical signal is subject to change. However, a description of a single application of the present invention is sufficient to disclose its principles.

The signal generated by the photo-sensitive device 25 is applied to a control grid 26 of a modulator electron tube 27 having a second control grid 28 to which a high frequency carrier wave is supplied over a conductor 29 from a high frequency source 31. The high frequency source 31 comprises an oscillator section 32 and an amplifier section 33 of conventional design. A balancing electron tube 34 is provided similar to the tube 27 and having a control grid 35 to which is applied a control voltage derived as hereinafter described. The carrier wave from the source 31 is supplied to a second control grid 36 of the balancing tube 34 in phase opposition to the carrier wave applied to the corresponding grid of the modulator tube. The anodes 37 and 38 of the tubes 27 and 34, respectively, are connected in parallel to a common load resistor 39 with the result that the output signals from the two tubes tend to balance each other. Screen grids 41 and 42 in the two tubes 27 and 34, respectively, are connected to the two ends of a potentiometer 43 having a movable contact 44 connected to a source of positive voltage. The potentiometer permits the relative amplification of the tubes to be initially adjusted so that the amplitude of the resultant carrier wave appearing across the load resistor 39 is substantially zero when the scanning drum 12 rotates through the interval between the end of one scan and the beginning of the next.

The common load resistor 39 of the tubes 27 and 34 is coupled to the grid 45 of a conventional amplifier electron tube 46 provided with a load resistor 47. While the subject is being scanned, the carrier wave is no longer balanced out and the modulated wave is amplified by the amplifier tube 46 and applied to utilization apparatus 48 which may include further amplification, gamma control, masking circuits and ultimately a recording device.

The output circuit of the amplifier 46 is also applied in parallel to the control grids 49 and 51 of electron tubes 52 and 53, respectively, which are preferably gas triodes. The anode operating potentials of the tubes 52 and 53 are supplied in phase opposition by means of an output transformer 54 which has a primary winding 55 connected by a conductor 56 to the high frequency source 31 during the interval between successive scans of the subject 11. The timing of the application of the carrier wave to the tubes 52 and 53 may conveniently be accomplished by a cam-operated switch 57 interposed in the conductor 56 between the high frequency source and the tubes. A cam 58 is associated with the scanning drum 12 and closes the switch 57 only momentarily during the required interval.

The tube 52 or 53 can only discharge when a peak of a positive half cycle of the carrier wave is supplied to its anode at the same time that a positive half cycle of sufficient amplitude is applied to its grid. If the potentiometer 43 is correctly adjusted, the carrier waves cancel each other in the common load resistor 39, and no signal is applied to the grids 49 and 51 of the tubes 52 and 53, respectively. A slight change in the characteristics of the circuits preceding the resistor 39 will cause a signal to appear on the grids 49 and 51 having a phase dependent upon whether the output signal from the modulator tube 34 is too great or too small to exactly balance the output signal from the tube 27. Accordingly, the tube 52 or 53 in which the grid and anode voltages are in phase will discharge.

Diode detectors 61 and 62 are capacitively coupled by the capacitors 59 and 60 to the tubes 52 and 53, respectively. The diode 61 has a load resistor 63 which is tapped at an intermediate point to ground. The cathode 64 of the diode 61 is connected through a decoupling resistor 65 to a conductor 66 which connects with the shunt combination of a resistor 67 and a capacitor 68 in the control grid circuit of the tube 34. The diode 62 has its cathode 69 grounded and has a load resistor 71 which is connected at an intermediate point through a decoupling resistor 72 to the conductor 66.

When the tube 52 discharges, a positive direct voltage develops between the cathode 64 of the diode 61 and ground and is applied through the lead 66 to raise the potential of the control grid 35 of the tube 34. On the other hand, if the tube 53 discharges, a negative potential appears between the intermediate point on the load resistor 71 and ground and is applied through the conductor 66 to reduce the voltage on the control grid 35 of the tube 34. The amplification of the tube 34 is consequently controlled in accordance with the phase and the amplitude of the error signal appearing across the common load resistor 39. The rapidity with which the control voltage on the grid 35 of the tube 34 may be varied is primarily determined by the time constant of the resistive-capacitive filter circuit 67, 68. As soon as the control voltage is such as to balance the output signals of the tubes 27 and 34, no further control voltage is applied over the conductor 66 until the charge across the capacitor 68 starts to leak away and a condition of unbalance can again be sensed by the tubes 52 and 53.

As a further explanation of how the control voltage is developed, when the system is balanced so that neither gas triode 52 nor gas triode 53 fires, an alternating voltage is developed at the plate of these tubes, and of course at the left hand sides of capacitors 59 and 60, whenever contacts 57 are closed. Since the frequency of this alternating voltage is high with respect to the frequency of rotation of the drum, many cycles of the voltage will be applied to the transformer 54 during this period.

When the circuit is balanced the voltage applied to the transformer results in a rectified voltage appearing across diodes 61 and 62. The circuitry associated with these diodes is such that under these conditions cathode 64 of diode 61 is positive with respect to ground while cathode 69 of diode 62 is at ground potential so the midpoint of resistor 71 will be negative with respect to ground. Due to the relatively long time constants of the circuit including resistors 72 and 65 with capacitor 68 and its associated resistor 67 the voltage at the junction of resistors 65 and 72 will not change appreciably during the time contacts 57 are open and therefore a balanced condition will result in a steady potential near ground depending on the exact values of the circuit components.

When an unbalance occurs at grids 49 and 53 one of the gas triodes fires depending on the phase of the unbalanced voltage. Assuming for the moment that grid 49 of triode 52 becomes positive at the same time the plate becomes positive, this triode will fire, thus essentially lowering this plate and one side of capacitor 59 to ground potential, the voltage being developed across the inherent resistance in the secondary of transformer 54. Thus the cathode 64 of diode 61 goes toward ground at a rate depending on the time constant of the circuits and a current flows through resistor 65 such that the junction between 65 and 72 goes negative with respect to its equilibrium value. This current results in a gradual discharging of condenser 68 with change in the potential of grid 35 of pentode 34, and the phases of the alternating current voltages are so connected that this will change the amplification of tube 34 in a direction to decrease the unbalanced voltage at grids 49 and 51.

If the unbalanced voltage developed is of the opposite phase from that considered above, gas triode 53 fires resulting in the mid-point of resistor 71 moving towards ground. This causes the junction of resistors 65 and 72 to move more positive, and the charge on the capacitor 68 assumes a more positive value. This, in turn, changes the amplification of pentode 34 in the opposite direction from that occurring when gas triode 52 fires, again bringing the circuit into balance.

The success of this apparatus depends on the time constant of the network including resistors 65, 72 and 67, together with capacitor 68, being very long with respect to the time of one revolution of the drum 58. If, for example, the time of revolution is once per second, then there must be no appreciable change in the charge across capacitor 63 during a period of perhaps 100 seconds. When, as happens due to inevitable changes in the electronic components, an unbalance occurs, a change in the voltage across capacitor 68 will take place slowly, and several revolutions of drum 58 may be required to develop the required potential at the junction of resistors 65 and 72 to cause the balance condition to again be reached. The sensitivity of the balancing circuit can be made high enough to result in obtaining a balance to any required degree and the obtaining of the required time constants is straightforward.

Since the voltage generated by the photo-sensitive detector 25 is continuously varying in accordance with the tone graduations of the subject 11 while the same is being scanned, the balancing operation can only be carried out between the end of one scan and the beginning of the succeeding scan. During this interval the photo-sensitive device 25 generates a voltage corresponding to a reference intensity light signal and the gain of the tube 34 is adjusted to produce an output signal which exactly balances the output signal from the tube 27. Accordingly, at the start of each scan, zero voltage across the load resistor 39 always corresponds to a light signal of predetermined intensity. This predetermined intensity may be set at any point in the intensity range between the complete absence of light on the photo-sensitive device 25 to the full intensity of the scanning beam thereon. For example, an opaque portion 73 on the drum 12 may represent the deepest tone found on the subject 11. It is to be understood that the overall time constant of the resistive capacitive filter 67, 68 and the diode detectors 61 and 62 and their associated resistors is sufficiently long to hold the balance of the system within acceptable limits during the active portion of the scanning cycle.

Other arrangements may be made for applying a reference light signal to the photo-sensitive device 25, since the reference light need not pass through the entire optical system but may follow a more or less separate path to the photo-sensitive device. Accordingly, the illustrated embodiment is to be considered as exemplary only and not as limiting the invention defined in the appended claims.

I claim:

1. In a scanning system, a rotatable cylindrical drum adapted to carry a visual subject in the form of a flexible sheet wrapped part way around the drum circumference to leave between the unlapped edges of the sheet a gap of short circumferential extent relative to that of the sheet; means to direct towards said drum when rotating a light beam which passes over the circumference thereof to cyclically traverse said subject and gap in alternation, means including photoelectric means whereby said subject and gap to develop from said beam a light signal comprised in alternation of relatively long trains of intensity variations representative of tonal gradations of said subject and of relatively short pulses of constant intensity light of reference intensity, an electric signal channel including said photoelectric means adapted to translate said alternately occurring variable intensity trains and constant intensity pulses of said light signal into corresponding trains and pulses in the amplitude of an electric signal developed in said channel, control means to electrically adjust the amplitude of said electric signal in accordance with the strength and sense of a control signal received by said control means, amplitude comparator means adapted when actuated to develop from said electric signal a signal corresponding to the difference in direction and amount of the instantaneous amplitude of said electric signal from a predetermined amplitude value therefor, means operable synchronously with the rotation of said drum to actuate said comparator means only when said beam is traversing said gap to thereby render said difference signal in the form of intermittent pulses of variable strength and sense, a resistance-capacitance network characterized by a time constant which is comparable in value to the time required for at least one rotation of said drum, means whereby said resistance-capacitance network is adapted to translate the intermittent pulses of said difference signal into a predominantly D.C. signal of a strength and sense corresponding to that of said last-named pulses, and to apply said D.C. signal as said control signal to said control means, and means whereby said D.C. signal is applied thereto with appropriate polarity to stabilize the characteristic expressing for said scanning system the quantitative relation between instantaneous light intensity and instantaneous amplitude as manifested, respectively, in said trains of said light signal and said trains of said electric signal.

2. In a scanning system, means for cyclically scanning a subject with a beam of light to generate a variable intensity light signal representative of tonal gradations in said subject, means for generating a constant intensity light signal during the periods between recurrent scanning cycles, a balanced circuit comprised of a pair of signal transfer stages having respective inputs and connected in balanced relation to provide a common output representing in amplitude and sense, respectively, the degree and direction of unbalance produced in said circuit by respective signals applied to said inputs, photoelectric means responsive to said light signals to generate corresponding electric signals, said photoelectric means being connected to supply said electric signals to the input of one of said stages, a resistance-capacitance circuit having a time constant comparable in value to the period of at least one scanning cycle and being responsive to the amplitude and sense at the output of said balanced circuit of the electric signal generated during the periods between recurrent scanning cycles to develop a predominantly D.C. control signal of an amplitude and sense corresponding to that manifested by said last-named electric signal, means whereby said resistance-capacitance circuit is connected to the input of the other of said stages to supply said D.C. signal to said balanced circuit in balancing relation with the electric signals supplied thereto from said photoelectric means, and means whereby said control signal is thereby adapted to stabilize the characteristic expressing for said scanning system the quantitative relation between the intensity of said light signals and the amplitude of said electric signals.

3. In a scanning system, means for cyclically scanning a subject with a beam of light to generate a variable intensity light signal representative of tonal gradations in said subject, means for generating a constant intensity light signal during the period between recurrent scanning cycles, a source of high frequency carrier signal, a balanced modulator circuit comprised of a pair of modulator stages, said stages being each connected with said source to receive said carrier signal in phase opposition and being connected together in balanced relation to provide a common output of said carrier in modulated form, said carrier at said output being modulated in amplitude in accordance with the degree of unbalance in said circuit of respective modulating signals applied to said inputs, and being of a phase indicating the direction of said unbalance, photoelectric means responsive to said light signals to generate corresponding electric signals, said photoelectric means being connected to supply said electric signals as modulating signals to the input of one of said modulator stages, phase-amplitude detector means adapted to demodulate said modulated carrier at said output during periods between recurrent scanning cycles to thereby produce from said modulated carrier a series of pulses of an amplitude and polarity which are representative, respectively, of the degree of modulation and of the phase of said carrier at said output, a resistance-capacitance circuit having a time constant comparable to the period of at least one scanning cycle and adapted to translate said series of pulses into a predominantly D.C. control signal of an amplitude and polarity corresponding to that then manifested by said pulses, and means whereby said resistance-capacitance circuit is connected to the input of the other of said modulator stages to supply said control signal to said balanced circuit as a modulating signal and in balancing relation with the electric modulating signals supplied thereto from said photoelectric means, and means whereby said control signal is thereby adapted to stabilize the characteristic expressing for said scanning system the quantitative relation between the intensity of said light signals and the amplitude of said electric signals.

References Cited in the file of this patent

UNITED STATES PATENTS

| | | |
|---|---|---|
| 2,124,044 | Vance | July 19, 1938 |
| 2,153,752 | Gurtler | Apr. 11, 1939 |

| | | |
|---|---|---|
| 2,317,850 | Finch | Apr. 27, 1943 |
| 2,347,015 | Wolaschak | Apr. 18, 1944 |
| 2,391,532 | Wilmotte | Dec. 25, 1945 |
| 2,412,423 | Rajchman et al. | Dec. 10, 1946 |
| 2,562,006 | Wheeler | July 24, 1951 |
| 2,570,665 | Gunderson | Oct. 9, 1951 |
| 2,573,554 | Dwyer | Oct. 30, 1951 |
| 2,696,523 | Theile | Dec. 7, 1954 |

FOREIGN PATENTS

| | | |
|---|---|---|
| 620,140 | Great Britain | Mar. 21, 1949 |